United States Patent
Gorobets

(10) Patent No.: US 7,185,208 B2
(45) Date of Patent: Feb. 27, 2007

(54) DATA PROCESSING

(75) Inventor: Sergey Anatolievich Gorobets, Edinburgh (GB)

(73) Assignee: Lexar Media, Inc., Fremont, CA (US)

( * ) Notice: Subject to any disclaimer, the term of this patent is extended or adjusted under 35 U.S.C. 154(b) by 749 days.

(21) Appl. No.: 10/260,136

(22) Filed: Sep. 27, 2002

(65) Prior Publication Data

US 2003/0126451 A1    Jul. 3, 2003

(51) Int. Cl.
*G06F 11/30* (2006.01)
*H04L 9/00* (2006.01)
*H04N 7/167* (2006.01)

(52) U.S. Cl. ............... 713/193; 713/167; 380/203; 380/210

(58) Field of Classification Search ............... 713/189, 713/193
See application file for complete search history.

(56) References Cited

U.S. PATENT DOCUMENTS

| | | | |
|---|---|---|---|
| 4,099,069 A | 7/1978 | Cricchi et al. | |
| 4,130,900 A | 12/1978 | Watanabe | |
| 4,210,959 A | 7/1980 | Wozniak | 364/200 |
| 4,309,627 A | 1/1982 | Tabata | |
| 4,355,376 A | 10/1982 | Gould | 365/230 |
| 4,398,248 A | 8/1983 | Hsia et al. | |
| 4,405,952 A | 9/1983 | Slakmon | 360/49 |
| 4,414,627 A | 11/1983 | Nakamura | |
| 4,450,559 A | 5/1984 | Bond et al. | 371/10 |
| 4,456,971 A | 6/1984 | Fukuda et al. | 364/900 |
| 4,468,730 A | 8/1984 | Dodd et al. | |
| 4,473,878 A | 9/1984 | Zolnowsky et al. | |
| 4,476,526 A | 10/1984 | Dodd | |
| 4,498,146 A | 2/1985 | Martinez | 364/900 |
| 4,525,839 A | 6/1985 | Nozawa et al. | 371/38 |
| 4,532,590 A | 7/1985 | Wallach et al. | |
| 4,609,833 A | 9/1986 | Gutterman | |
| 4,616,311 A | 10/1986 | Sato | 364/200 |
| 4,654,847 A | 3/1987 | Dutton | 371/10 |
| 4,710,871 A | 12/1987 | Belknap et al. | 364/200 |
| 4,746,998 A | 5/1988 | Robinson et al. | 360/72.1 |
| 4,748,320 A | 5/1988 | Yorimoto et al. | 235/492 |
| 4,757,474 A | 7/1988 | Fukushi et al. | 365/189 |
| 4,774,700 A | 9/1988 | Satoh et al. | 369/54 |
| 4,780,855 A | 10/1988 | Iida et al. | |

(Continued)

FOREIGN PATENT DOCUMENTS

| | | |
|---|---|---|
| AU | 0 557 723 | 1/1987 |
| EP | 0 220 718 A2 | 5/1987 |
| EP | 0 243 503 A1 | 11/1987 |
| EP | 0 392 895 A2 | 10/1990 |
| EP | 0 424 191 A2 | 4/1991 |
| EP | 0 489 204 A1 | 6/1992 |
| EP | 0 522 780 A2 | 1/1993 |

(Continued)

OTHER PUBLICATIONS

Book—*Computer Architecture and Parallel Processing*, Kai Hwang & Faye A. Briggs, McGraw-Hill Book Co., © 1984, p. 64.

(Continued)

*Primary Examiner*—Kambiz Zand
(74) *Attorney, Agent, or Firm*—Law Offices of Imam

(57) ABSTRACT

In one embodiment of the present invention, there is disclosed a reversible method of processing data comprising the data being encrypted before being written to a non-volatile memory wherein the data cannot be accessed without decryption in the case of a direct physical access to the non-volatile memory.

17 Claims, 9 Drawing Sheets

U.S. PATENT DOCUMENTS

| | | | |
|---|---|---|---|
| 4,788,665 A | 11/1988 | Fukuda et al. | |
| 4,797,543 A | 1/1989 | Watanabe | |
| 4,800,520 A | 1/1989 | Iijima | 364/900 |
| 4,829,169 A | 5/1989 | Watanabe | |
| 4,843,224 A | 6/1989 | Ohta et al. | |
| 4,896,262 A | 1/1990 | Wayama et al. | 364/200 |
| 4,914,529 A | 4/1990 | Bonke | 360/48 |
| 4,920,518 A | 4/1990 | Nakamura et al. | 365/228 |
| 4,924,331 A | 5/1990 | Robinson et al. | 360/72.1 |
| 4,943,745 A | 7/1990 | Watanabe et al. | |
| 4,953,122 A | 8/1990 | Williams | 364/900 |
| 4,970,642 A | 11/1990 | Yamamura | |
| 4,970,727 A | 11/1990 | Miyawaki et al. | |
| 5,070,474 A | 12/1991 | Tuma et al. | 395/500 |
| 5,093,785 A | 3/1992 | Iijima | |
| 5,150,407 A | 9/1992 | Chan | |
| 5,168,465 A | 12/1992 | Harari | 257/320 |
| 5,198,380 A | 3/1993 | Harari | 437/43 |
| 5,200,959 A | 4/1993 | Gross et al. | 371/21.6 |
| 5,218,695 A | 6/1993 | Noveck et al. | |
| 5,220,518 A | 6/1993 | Haq | |
| 5,226,168 A | 7/1993 | Kobayashi et al. | 395/800 |
| 5,227,714 A | 7/1993 | Lou | |
| 5,253,351 A | 10/1993 | Yamamoto et al. | |
| 5,267,218 A | 11/1993 | Elbert | |
| 5,268,318 A | 12/1993 | Harari | 437/43 |
| 5,268,870 A | 12/1993 | Harari | 365/218 |
| 5,270,979 A | 12/1993 | Harari et al. | 365/218 |
| 5,293,560 A | 3/1994 | Harari | 365/185 |
| 5,297,148 A | 3/1994 | Harari et al. | 371/10.2 |
| 5,303,198 A | 4/1994 | Adachi et al. | 365/218 |
| 5,305,276 A | 4/1994 | Uenoyama | |
| 5,305,278 A | 4/1994 | Inoue | |
| 5,315,541 A | 5/1994 | Harari et al. | 365/63 |
| 5,315,558 A | 5/1994 | Hag | |
| 5,329,491 A | 7/1994 | Brown et al. | |
| 5,337,275 A | 8/1994 | Garner | 365/189.01 |
| 5,341,330 A | 8/1994 | Wells et al. | 365/185 |
| 5,341,339 A | 8/1994 | Wells | |
| 5,341,341 A | 8/1994 | Fukazo | |
| 5,353,256 A | 10/1994 | Fandrich et al. | 365/230.03 |
| 5,357,475 A | 10/1994 | Hasbun et al. | 365/218 |
| 5,359,569 A | 10/1994 | Fujita et al. | |
| 5,365,127 A | 11/1994 | Manley | |
| 5,369,615 A | 11/1994 | Harari et al. | 365/218 |
| 5,371,702 A | 12/1994 | Nakai et al. | |
| 5,381,539 A | 1/1995 | Yanai et al. | |
| 5,382,839 A | 1/1995 | Shinohara | |
| 5,384,743 A | 1/1995 | Rouy | |
| 5,388,083 A | 2/1995 | Assar et al. | 365/218 |
| 5,392,356 A * | 2/1995 | Konno et al. | 380/249 |
| 5,396,468 A | 3/1995 | Harari et al. | 365/218 |
| 5,404,485 A | 4/1995 | Ban | |
| 5,406,527 A | 4/1995 | Honma | |
| 5,418,752 A | 5/1995 | Harari et al. | 365/218 |
| 5,422,842 A | 6/1995 | Cernea et al. | 365/185 |
| 5,422,856 A | 6/1995 | Sasaki et al. | |
| 5,428,621 A | 6/1995 | Mehrotra et al. | 371/21.4 |
| 5,430,682 A | 7/1995 | Ishikawa et al. | |
| 5,430,859 A | 7/1995 | Norman et al. | 395/425 |
| 5,431,330 A | 7/1995 | Wieres | |
| 5,434,825 A | 7/1995 | Harari | 365/185 |
| 5,438,573 A | 8/1995 | Mangan et al. | 371/10.3 |
| 5,465,235 A | 11/1995 | Miyamoto | |
| 5,465,338 A | 11/1995 | Clay | |
| 5,471,478 A | 11/1995 | Mangan et al. | 371/10.3 |
| 5,473,765 A | 12/1995 | Gibbons et al. | |
| 5,479,638 A | 12/1995 | Assar et al. | 395/430 |
| 5,485,595 A | 1/1996 | Assar et al. | 395/430 |
| 5,490,117 A | 2/1996 | Oda et al. | |
| 5,495,442 A | 2/1996 | Cernea et al. | 365/185.03 |
| 5,504,760 A | 4/1996 | Harari et al. | 371/40.1 |
| 5,508,971 A | 4/1996 | Cernea et al. | 365/185.23 |
| 5,513,138 A | 4/1996 | Manabe et al. | |
| 5,515,333 A | 5/1996 | Fujita et al. | |
| 5,519,847 A | 5/1996 | Fandrich et al. | |
| 5,523,980 A | 6/1996 | Sakui et al. | |
| 5,524,230 A | 6/1996 | Sakaue et al. | 395/430 |
| 5,530,673 A | 6/1996 | Tobita et al. | |
| 5,530,828 A | 6/1996 | Kaki et al. | |
| 5,530,938 A | 6/1996 | Akasaka et al. | |
| 5,532,962 A | 7/1996 | Auclair et al. | 365/201 |
| 5,532,964 A | 7/1996 | Cernea et al. | 365/189.09 |
| 5,534,456 A | 7/1996 | Yuan et al. | 437/43 |
| 5,535,328 A | 7/1996 | Harari et al. | 395/182.05 |
| 5,541,551 A | 7/1996 | Brehner et al. | |
| 5,544,118 A | 8/1996 | Harari | 365/218 |
| 5,544,356 A | 8/1996 | Robinson et al. | 395/600 |
| 5,552,698 A | 9/1996 | Tai et al. | |
| 5,554,553 A | 9/1996 | Harari | 437/43 |
| 5,563,825 A | 10/1996 | Cernea et al. | 365/185.18 |
| 5,566,314 A | 10/1996 | DeMarco et al. | 395/430 |
| 5,568,439 A | 10/1996 | Harari | 365/218 |
| 5,572,466 A | 11/1996 | Sukegawa | |
| 5,579,502 A | 11/1996 | Konishi et al. | |
| 5,581,723 A | 12/1996 | Hasbun et al. | |
| 5,583,812 A | 12/1996 | Harari | 365/185.33 |
| 5,592,415 A | 1/1997 | Kato et al. | |
| 5,592,420 A | 1/1997 | Cernea et al. | 365/185.18 |
| 5,596,526 A | 1/1997 | Assar et al. | |
| 5,598,370 A | 1/1997 | Niisima et al. | |
| 5,602,987 A | 2/1997 | Harari et al. | |
| 5,603,001 A | 2/1997 | Sukegawa et al. | |
| 5,606,660 A | 2/1997 | Estakhri et al. | |
| 5,611,067 A | 3/1997 | Okamoto et al. | |
| 5,640,528 A | 6/1997 | Harney et al. | |
| 5,642,312 A | 6/1997 | Harari | 365/185.33 |
| 5,648,929 A | 7/1997 | Miyamoto | |
| 5,663,901 A | 9/1997 | Wallace et al. | 365/52 |
| 5,666,516 A * | 9/1997 | Combs | 711/163 |
| 5,693,570 A | 12/1997 | Cernea et al. | 437/205 |
| 5,712,819 A | 1/1998 | Harari | 365/185.29 |
| 5,719,808 A | 2/1998 | Harari et al. | 365/185.33 |
| 5,723,990 A | 3/1998 | Roohparvar | |
| 5,734,567 A | 3/1998 | Griffiths et al. | |
| 5,745,418 A | 4/1998 | Ma et al. | |
| 5,754,567 A | 5/1998 | Norman | |
| 5,757,712 A | 5/1998 | Nagel et al. | |
| 5,758,100 A | 5/1998 | Odisho | |
| 5,761,117 A | 6/1998 | Uchino et al. | |
| 5,765,197 A * | 6/1998 | Combs | 711/164 |
| 5,768,190 A | 6/1998 | Tanaka et al. | |
| 5,768,195 A | 6/1998 | Nakamura et al. | |
| 5,773,901 A | 6/1998 | Kanter | |
| 5,778,418 A | 7/1998 | Auclair et al. | 711/101 |
| 5,781,478 A | 7/1998 | Takeeuchi et al. | |
| 5,787,445 A | 7/1998 | Daberko | |
| 5,787,484 A | 7/1998 | Norman | |
| RE35,881 E | 8/1998 | Barrett et al. | |
| 5,799,168 A | 8/1998 | Ban | |
| 5,802,551 A | 9/1998 | Komatsu et al. | |
| 5,809,515 A | 9/1998 | Kaki et al. | |
| 5,809,558 A | 9/1998 | Matthews et al. | |
| 5,809,560 A | 9/1998 | Schneider | |
| 5,818,350 A | 10/1998 | Estakhri et al. | |
| 5,818,781 A | 10/1998 | Estakhri et al. | |
| 5,822,245 A | 10/1998 | Gupta et al. | |
| 5,822,252 A | 10/1998 | Lee et al. | |
| 5,822,781 A | 10/1998 | Wells et al. | |
| 5,831,929 A | 11/1998 | Manning | |
| 5,835,935 A | 11/1998 | Estakhri et al. | |
| 5,838,614 A | 11/1998 | Estakhri et al. | |
| 5,845,313 A | 12/1998 | Estakhri et al. | |
| 5,847,552 A | 12/1998 | Brown | |

| | | | |
|---|---|---|---|
| 5,860,083 A | 1/1999 | Sukeawa |
| 5,860,124 A | 1/1999 | Matthews et al. |
| 5,862,099 A | 1/1999 | Gannage et al. |
| 5,890,192 A | 3/1999 | Lee et al. |
| 5,901,086 A | 5/1999 | Wang et al. |
| 5,907,856 A | 5/1999 | Estakhri et al. |
| 5,909,586 A | 6/1999 | Anderson |
| 5,920,884 A | 7/1999 | Jennings, III et al. |
| 5,924,113 A | 7/1999 | Estakhri et al. |
| 5,928,370 A | 7/1999 | Asnaashari |
| 5,930,815 A | 7/1999 | Estakhri et al. |
| 5,933,368 A | 8/1999 | Ma et al. |
| 5,933,846 A | 8/1999 | Endo |
| 5,936,971 A | 8/1999 | Harari et al. |
| 5,937,425 A | 8/1999 | Ban |
| 5,953,737 A | 9/1999 | Estakhri et al. |
| 5,956,473 A | 9/1999 | Ma et al. |
| 5,959,926 A | 9/1999 | Jones et al. |
| 5,966,727 A | 10/1999 | Nishino |
| 5,986,933 A | 11/1999 | Takeuchi et al. |
| 5,987,563 A | 11/1999 | Itoh et al. |
| 5,987,573 A | 11/1999 | Hiraka |
| 5,991,849 A | 11/1999 | Yamada et al. |
| 6,011,322 A | 1/2000 | Stumfall et al. |
| 6,011,323 A | 1/2000 | Camp |
| 6,018,265 A | 1/2000 | Keshtbod |
| 6,021,408 A | 2/2000 | Ledain et al. |
| 6,026,020 A | 2/2000 | Matsubara et al. |
| 6,026,027 A | 2/2000 | Terrell, II et al. |
| 6,034,897 A | 3/2000 | Estakhri et al. |
| 6,035,357 A | 3/2000 | Sakaki |
| 6,040,997 A | 3/2000 | Estakhri |
| 6,041,001 A | 3/2000 | Estakhri |
| 6,047,352 A | 4/2000 | Lakhani et al. |
| 6,055,184 A | 4/2000 | Acharya et al. |
| 6,055,188 A | 4/2000 | Takeuchi et al. |
| 6,069,827 A | 5/2000 | Sinclair |
| 6,072,796 A | 6/2000 | Christensen et al. |
| 6,076,137 A | 6/2000 | Asnaashari |
| 6,081,447 A | 6/2000 | Lofgren et al. |
| 6,081,878 A | 6/2000 | Estakhri et al. |
| 6,084,483 A | 7/2000 | Keshtbod |
| 6,089,460 A | 7/2000 | Hazama |
| 6,097,666 A | 8/2000 | Sakui et al. |
| 6,115,785 A | 9/2000 | Estakhri et al. |
| 6,122,195 A | 9/2000 | Estakhri et al. |
| 6,122,716 A * | 9/2000 | Combs ...................... 711/163 |
| 6,125,424 A | 9/2000 | Komatsu et al. |
| 6,125,435 A | 9/2000 | Estakhri et al. |
| 6,128,695 A | 10/2000 | Estakhri et al. |
| 6,134,145 A | 10/2000 | Wong |
| 6,134,151 A | 10/2000 | Estakhri et al. |
| 6,141,249 A | 10/2000 | Estakhri et al. |
| 6,145,051 A | 11/2000 | Estakhri et al. |
| 6,151,247 A | 11/2000 | Estakhri et al. |
| 6,172,906 B1 | 1/2001 | Estakhri et al. |
| 6,173,362 B1 | 1/2001 | Yoda |
| 6,181,118 B1 | 1/2001 | Meehan et al. |
| 6,182,162 B1 | 1/2001 | Estakhri et al. |
| 6,202,138 B1 | 3/2001 | Estakhri et al. |
| 6,223,308 B1 | 4/2001 | Estakhri et al. |
| 6,226,708 B1 | 5/2001 | McGoldrick et al. |
| 6,230,234 B1 | 5/2001 | Estakhri et al. |
| 6,262,918 B1 | 7/2001 | Estakhri et al. |
| 6,272,610 B1 | 8/2001 | Katayama et al. |
| 6,275,436 B1 | 8/2001 | Tobita et al. |
| 6,279,069 B1 | 8/2001 | Robinson et al. |
| 6,279,114 B1 | 8/2001 | Toombs et al. |
| 6,282,651 B1 | 8/2001 | Ashe |
| 6,285,607 B1 | 9/2001 | Sinclair |
| 6,327,639 B1 | 12/2001 | Asnaashari |
| 6,345,367 B1 | 2/2002 | Sinclair |
| 6,374,337 B1 | 4/2002 | Estakhri |
| 6,385,667 B1 | 5/2002 | Estakhri et al. |
| 6,393,513 B2 | 5/2002 | Estakhri et al. |
| 6,397,314 B1 | 5/2002 | Estakhri et al. |
| 6,411,546 B1 | 6/2002 | Estakhri et al. |
| 6,467,021 B1 | 10/2002 | Sinclair |
| 6,490,649 B2 | 12/2002 | Sinclair |
| 6,567,307 B1 | 5/2003 | Estakhri |
| 6,578,127 B1 | 6/2003 | Sinclair |
| 6,587,382 B1 | 7/2003 | Estakhri et al. |
| 6,711,059 B2 | 3/2004 | Sinclair et al. |
| 6,721,819 B2 | 4/2004 | Estakhri et al. |
| 6,721,843 B1 | 4/2004 | Estakhri |
| 6,725,321 B1 | 4/2004 | Sinclair et al. |
| 6,728,851 B1 | 4/2004 | Estakhri et al. |
| 6,751,155 B2 | 6/2004 | Gorobets |
| 6,757,800 B1 | 6/2004 | Estakhri et al. |
| 6,772,274 B1 | 8/2004 | Estakhri |
| 6,813,678 B1 | 11/2004 | Sinclair et al. |
| 6,898,662 B2 | 5/2005 | Gorobets |
| 6,898,721 B2 * | 5/2005 | Schmidt ...................... 713/322 |
| 6,912,618 B2 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 7,000,064 B2 | 2/2006 | Payne et al. |
| 2003/0033471 A1 | 2/2003 | Lin et al. |

FOREIGN PATENT DOCUMENTS

| | | |
|---|---|---|
| EP | 0 537 925 A1 | 4/1993 |
| EP | 0 544 252 A2 | 6/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| EP | 0 686 976 A2 | 12/1995 |
| EP | 0 897 579 B1 | 7/2000 |
| EP | 1 043 860 A2 | 10/2000 |
| EP | 0 891 580 B1 | 11/2000 |
| EP | 0 896 699 B1 | 11/2000 |
| EP | 1 056 015 A1 | 11/2000 |
| EP | 1 074 906 A1 | 2/2001 |
| EP | 0 852 766 B1 | 5/2001 |
| EP | 0 852 765 B1 | 9/2001 |
| EP | 0 722 585 B1 | 5/2002 |
| EP | 0 910 826 B1 | 6/2002 |
| EP | 0 691 008 B1 | 11/2002 |
| EP | 0 861 468 B1 | 4/2003 |
| EP | 0 978 040 B1 | 5/2004 |
| EP | 1 157 328 B1 | 5/2005 |
| FR | 93 01908 | 8/1993 |
| GB | 2 251 323 A | 7/1992 |
| GB | 2 291 990 A | 2/1996 |
| GB | 2 291 991 A | 2/1996 |
| GB | 2 297 637 A | 8/1996 |
| GB | 2 304 428 A | 3/1997 |
| GB | 2 348 991 B | 12/2002 |
| GB | 2 351 822 B | 1/2003 |
| GB | 2 384 337 A | 7/2003 |
| GB | 2 384 883 A | 10/2005 |
| GB | 2 384 338 B | 11/2005 |
| GB | 2 384 072 B | 12/2005 |
| GB | 2 411 499 B | 2/2006 |
| IS | 117881 | 5/2003 |
| JP | 59-45695 A | 9/1982 |
| JP | 58-215794 A | 12/1983 |
| JP | 58-215795 A | 12/1983 |
| JP | 59-162695 A | 9/1984 |
| JP | 60-212900 | 10/1985 |
| JP | 61-96598 A | 5/1986 |
| JP | 62-283496 A | 12/1987 |
| JP | 62-283497 A | 12/1987 |

| | | |
|---|---|---|
| JP | 63-183700 A | 7/1988 |
| JP | 1-138694 A | 5/1989 |
| JP | 3-228377 A | 10/1991 |
| JP | 4-57295 A | 2/1992 |
| JP | 4-254994 A | 9/1992 |
| JP | 4-268284 A | 9/1992 |
| JP | 4-278297 A | 10/1992 |
| JP | 4-332999 A | 11/1992 |
| JP | 5-128877 A | 5/1993 |
| JP | 5-282883 A | 10/1993 |
| JP | 6-36578 A | 2/1994 |
| JP | 6-124175 A | 5/1994 |
| JP | 6-124231 A | 5/1994 |
| JP | 6-131889 A | 5/1994 |
| JP | 6-132747 A | 5/1994 |
| JP | 6-149395 A | 5/1994 |
| JP | 6-266596 A | 9/1994 |
| JP | 7-93499 A | 4/1995 |
| JP | 7-311708 A | 11/1995 |
| JP | 8-18018 A | 1/1996 |
| JP | 8-69696 A | 3/1996 |
| JP | 9-147581 A | 6/1997 |
| SU | 138877 A1 | 4/1988 |
| SU | 1408439 A1 | 7/1988 |
| SU | 1515164 A1 | 10/1989 |
| SU | 1541619 A1 | 2/1990 |
| SU | 1573458 A2 | 6/1990 |
| SU | 1686449 A2 | 10/1991 |
| WO | 84/00628 | 2/1984 |
| WO | WO 94/20906 A1 | 9/1994 |
| WO | WO 95/16238 A1 | 6/1995 |
| WO | WO 00/26791 A2 | 5/2000 |

OTHER PUBLICATIONS

Magazine—"State of the Art: Magnetic VS. Optical Store Data in a Flash", by Walter Lahti and Dean McCarron, Byte magazine dated Nov. 1, 1990. 311, vol. 15, No. 12.

Magazine—Technology Updates, Integrated Cirrcuits, "1-Mbit flash memories seek their role in system design", Ron Wilson, Senior Editor, Computer Design magazine 28 (1989) Mar. 1, No. 5, Tulsa OK. US, pp. 30 and 32.

1992 Symposium of VLSI Circuits Digest of Technical Papers, "EEPROM for Solid State Disk Applications", S. Mehoura et al., SunDisk Corporation, Santa Clara, CA. R.W. Gregor et al., AT&T Bell Laboratories, Allentown, PA. pp. 24 and 25.

Mendel Rosenblum and John K. Ousterhout, The Design and Implementation of a Log-Structured File System, article, 1991, 15 pgs., Berkeley, USA.

Brian Dipert and Markus Levy, Designing with Flash Memory, book, Apr. 1994, 445 pgs., Annabooks, San Diego, USA.

Science Forum, Inc., Flash Memory Symposium '95, symposium, 1995, 13 pgs.; Hongo, Bunkyo-ku, Tokyo.

Ross S. Finlayson and David R. Cheriton, An Extended File Service Exploiting Write-Once Storage, article, 1987, 10 pgs., ACM.

Jason Gait, The Optical File Cabinet: A Random-Access File System for Write-Once Optical Disks, article, Jun. 1988, 12 pgs., Beaverton, Oregon.

Henry G. Baker, Memory Management, book, 1995, 19 pgs., Springer-Verlag Berlin Heidelberg, Germany.

Sape J. Mullender and Andrew S. Tanenbaum, A Distributed File Service Based on Optimistic Concurrency Control, article, 1985, 12 pgs., ACM.

Hiroshi Nakamura, Junichi Miyamoto, Kenichi Imamiya and Yoshihisa Iwata, A Novel Sense Amplifier for Flexible Voltage Operation NAND Flash Memories, symposium, 1995, VLSI Circuits Digest of Technical Papers,, 2 pgs.

Hiroshi Nakamura, Junichi Miyamoto, Kenichi Imamiya, Yoshihisa Iwata, Yoshihisa Sugihara and Hideko Oodaira, A Novel Sensing Scheme with On-Chip Page Copy for Flexible Voltage NAND Flash Memories, article, Jun. 1996, 9 pgs., vol. E79-C, No. 6.

Takaaki Nozaki, Toshiaki Tanaka, Yoshiro Kijiya, Eita Kinoshita, Tatsuo Tsuchiya and Yutaka Hayashi, A 1-Mb EEPROM with MONOS Memory Cell for Semiconductor Disk Application, article, 1991, 5 pgs., Journal Of Solid-State Circuits, vol. 26, No. 4.

Kai Hwang and Faye A. Briggs, Computer Architecture and Parallel Processing, book, 1984, McGraw-Hill, Inc., 2 pgs., US.

Walter Lahti and Dean McCarron, State of the Art: Magnetic VS. Optical Store Data in a Flash, article, 1990, 7 pgs., vol. 15, No. 12, McGraw-Hill, Inc., US.

Ron Wilson, Integrated Circuits; 1-Mbit flash memories seek their role in system design, article, Mar. 1, 1989, 2 pgs., No. 6, Tulsa, OK.

S. Mehroura, J.H. Yuan, R.A. Cemea, W.Y. Chien, D.C. Guteman, G. Samachisa, R.D. Noman, M. Mofidi, W.Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, Serial 9Mb F EEPROM for Solid State Disk Applications, symposium, 1992, 2 pgs., Mountain View, CA.

Steven H. Leibson, Nonvolatile, in-circuit-reprogrammable memories, article, Jan. 3, 1991, 12 pgs., EDN, Circle No. 12.

Walter Lahti and Dean McCarron, State of the Art: Magnetic VS. Optical Store Data in a Flash, article, 1990, 7 pgs., vol. 15, No. 12, McGraw-Hill, Inc., US.

Kai Hwang and Faye A. Briggs, Computer Architecture and Parallel Processing. book, 1984, McGraw-Hill, Inc., 2 pgs., US.

Ramon Caceres, Fred Douglis, Kai Li and Brian Marsh, Operationg System Implications of Solid-State Mobile Computers, article, 7 pgs., Oct. 1993, Workshop on Workstation Operting Systems.

Michael Wu and Wily Zwaenepoel, A Non-Volatile, Main Memory Storage System, 12 pgs., 1994, ACM, San Jose, CA USA.

Dave Bursky, Innovative flash memories match DRAM densities: available with a choice of features, flash memories are finding homes in many systems (includes related articles on the origins of flash, and on the differences between NAND and NOR flash memories), article, May 16, 1994, 9 pgs., Electronic Design, v.42, n.10, The Gale Group.

Anthony Cataldo, New flash enhancements up ante. (Intel's 28F400BV-120 and 28F004BV-120, Atmel's AT29BV010 and AT29BV020, and Samsung Semiconductor's KM29V32000 *flash* memory* devices)(Product Announcement), article, Mar. 13, 1995, 4 pgs., Electronic News, v.41, n.2056, The Gale Group.

Sam Weber, *Flash* modules' portability, reusability, small size valued for a host of APPs—Consumer formats flocking to *flash*, article, Jul. 22, 1996, 9 pgs., Electronic Engineering Times, n.911, CMP Media.

Toshiba, MOS Memory (Non-Volatile), 1995, Data Book.

Stan Baker, But Integration Calls for Hardware, Software Changes: Flash: designers face the dawn of a new memory age, article, Sep. 12, 2003, 5 pgs., Electronic Engineering Times, 1990, N.619, 41, CMP Media.

Toshiba, Toshiba MOS Digital Integrated Circuit Silicon Gate CMOS, (TC58NS512DC) Mar. 21, 2001, 43 pgs., Data Book.

Toshiba Corporation, SMIL (Smartmedia Interface Library) Hardware Edition Version 1.00, Jul. 1, 2000, 36 pgs., Data Book.

Toshiba, Toshiba MOS Digital Integrated Circuit Silicon Gate, (TC58512FT), Mar. 5, 2001, 43 pgs., Data Book.

Toshiba, Toshiba MOS Digital Integrated Circuit Silicon Gate, (TC58DVM92A1FT00), Jan. 10, 2003, 44 pgs., Data Book.

Toshiba, Toshiba MOS Digital Integrated Circuit Silicon Gate, (TC58DVG02A1FT00), Jan. 10, 2003, 44 pgs., Data Book.

Toshiba, Toshiba MOS Digital Integrated Circuit Silicon Gate, (TH58100FT), Mar. 5, 2001, 43 pgs., Data Book.

35Nonvolatile Memory Technology Review, A Time of Change, Proceedings 1993 Conference, Jun. 22-24, 1993, Linthicum Heights, MD USA.

Toshiba Corporation, SMIL (Smartmedia Interface Library) Software Edition Version 1.00, Jul. 1, 2000, 136 pgs., Data Book.

Toshiba, MOS Memory (Non-Volatile), 1996, 279 pgs., Data Book.

Dan Auclair, Optimal Solid State Disk Architecture For Portable Computers, symposium, Jul. 9, 1991, 7 pgs., SunDisk Corporation.

* cited by examiner

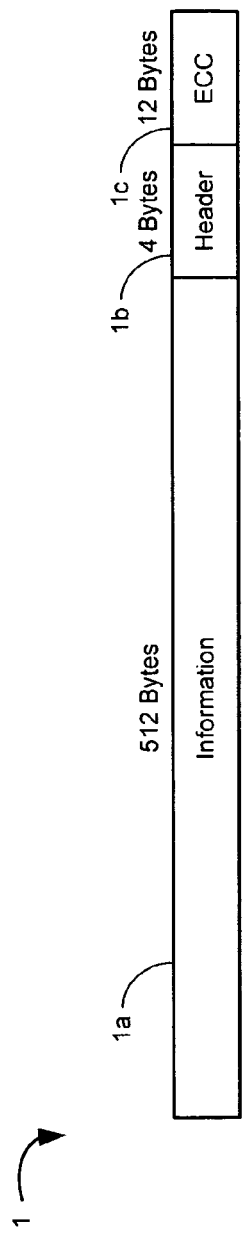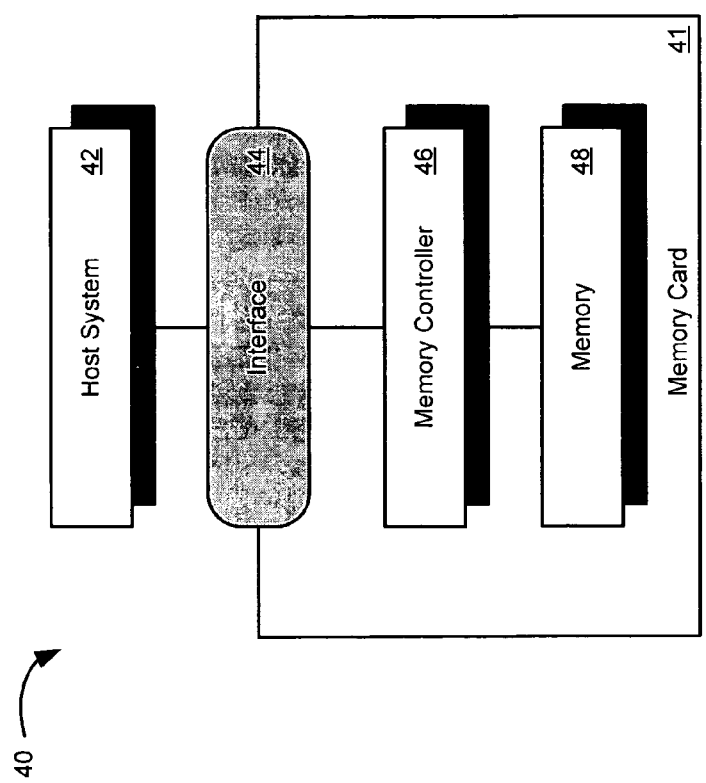
FIG. 2 (Prior Art)
FIG. 3 (Prior Art)

DATA PROCESSING

CROSS REFERENCE TO RELATED APPLICATION

This application claims the benefit of the priority date of my earlier filed British Application No. 0123417.8, entitled "Improved Data Processing", filed on Sep. 28, 2001.

BACKGROUND OF THE INVENTION

1. Field of the Invention

The present invention relates generally to an improved process of encrypting data and corresponding process of decrypting data for use within non-volatile memory, for example to provide a known level of security within a data processing system and particularly to a reversible method and apparatus of processing data comprising the data being encrypted before being written to a non-volatile memory wherein the data cannot be accessed without decryption in the case of a direct physical access to the non-volatile memory.

2. Description of the Prior Art

In known data processing systems having an on-volatile memory such as flash memory it is common for user data to be written to the flash memory without any modification taking place. An example of a known data processing system shown in FIG. 1 is a flash memory card 12 connected via a controller chip 19 to a host 8 (such as an ATA PC Card or Compact Flash card). The controller chip 19 is provided with an input/output port 15 which connects host 8 to host interface 16. Host interface and registers 16 are then connected to a port of a sector buffer SRAM 10 which conveniently is dual-port. A datapatch controller 18, and ECC generator and checker 20 and a flash memory interface (FMI) 22 are also all connected to the SRAM 10. The FMI 22 is also connected via a flash memory port 25 to flash memory 12. The controller chip 19 also includes microprocessor 32, I this case being a RISC processor, a processor SRAM 30, a processor mask ROM 28 and a port for an external program ROM/RAM 27 which is connected to a program RAM interface 26. An optional debug port 34 may also be provided for the RISC processor 32. Data and commands are communicated between various components of the controller 19, with the exception of the sector buffer memory 10, via microprocessor bus 24. The user data which is sent by the host 8 via the host interface port 15 is transferred to the sector buffer 10 without modification. The controller 19 then adds a control overhead, and writes the composite data (which typically is referred to as a ('logical sector') to the flash memory 12 via the flash memory port 25. The control overhead typically includes header data, which contains control information, and error correct code (ECC). Memory 12 stores the data (or logical sector) after encryption in a group of memory locations which are referred to as a 'memory sector'. A memory sector need not be a physical portion within memory 12 nor need it be formed by contiguous memory locations. The function of the controller 19 is to present the logical characteristics of a disc storage device to the host 8.

In FIG. 2 the typical data partitioning in flash memory is shown. A typical memory sector 1 contains 512 memory is shown. A typical memory sector 1 contains 512 bytes of information data 1a, 4 bytes of header data 1b, and 12 bytes of ECC 1c. Generally the information data 1a comes from the host, the header data 1b is generated by the controller processor 32 and the ECC is generated by hardware, i.e. ECC generator 20 of FIG. 1. The ECC may protect the user data only, or both the user data and the header data depending on the ECC generation function applied.

This means that if the flash memory card 12 is physically opened and disassembled the flash memory contents can be accessed directly and the contents of the user data portions, or memory sectors, can be read.

In FIG. 3 is illustrated a top level structure 40 of a memory device system such as that of FIG. 1. The system 40 has a secure memory card interface 44 which is capable of enabling or disabling access to the memory card 41 as a data storage device. As detailed previously the user data, or host data, from host system 42 is written to the memory 48. However, the host system 42 cannot access the memory 48 of the system 40 without sending a valid password to the memory card 41. This password protected interface, or secure memory card interface 44, between the host system 42 and the card 41 protects the data from unauthorized access via the standard host interface 44. However, it is still possible to access the data directly via the memory interface if the device is disassembled. This type of method of password protected access is incorporated into the ATA and compact flash standards for non-volatile memory devices.

Thus, a need arises to obviate or mitigate at least one of the aforementioned problems.

SUMMARY OF THE INVENTION

An object of the present invention is to provide a reversible method of processing data comprising the data being encrypted before being written to a non-volatile memory wherein the data cannot be accessed without decryption in the case of a direct physical access to the non-volatile memory.

In a first aspect of the present invention there is provided a reversible method of processing data which comprises the encryption of data before it is written to non-volatile memory so that it cannot be accessed without decryption in the case of a direct physical access to the non-volatile memory, wherein the encryption of data is carried out by an encryption process which comprises the user data and associate header data undergoing at least one of the two steps of scrambling and encoding.

Preferably the encryption process further comprises the other of the two steps of scrambling and encoding.

Conveniently the encryption process may further comprise at least one further encoding step.

Preferably the user data and header data is divided into portions, and the step of scrambling the user data and header data is performed by a portion address to flash portion address function.

Preferably the step of encoding the user data and header data is performed by a data to flash data function.

Conveniently the non-volatile memory is flash memory.

Conveniently the encrypted data of non-volatile memory can be decrypted by applying the reverse of the encryption process to the encrypted data.

Conveniently the steps of scrambling the encoding are conditional operations and have memory sector address as input which is independent from a host defined logical sector address.

Preferably the addresses of the data portions parameterize the data encoding.

Preferably the step of scrambling the data uses user data or other data supplied by the host as extra input as a parameter for use in the scrambling function.

Conveniently the steps of scrambling and encoding are implemented by hardware.

Preferably the header data provides at least some control information.

Preferably the portion address to flash portion address function is parameterized by a memory sector address to which the encrypted data is written.

In a second aspect the invention comprises a method of decrypting said encrypted data wherein the encrypted data undergoes a decryption process which is the reverse of the encryption process applied to encrypt the data.

Conveniently the decryption process comprises at least one of the two steps of scrambling and decoding. Preferably the decryption process comprises the step of unscrambling and at least one decoding step as appropriate.

Preferably the step of decoding and data is performed by a flash data to data function.

Preferably the step of unscrambling the data is performed by a portion flash address to portion address function.

Preferably the data which has undergone the first step of decryption and the original error correction code is used to check the integrity of all the data which results form the decryption.

In a third aspect of the present invention there is provided a memory system adapted for use with a non-volatile memory and which is arranged to present the logical characteristics of a disc storage device to a host system, wherein the memory system comprises a controller to manage the data transfers to and from the non-volatile memory, the controller being adapted reversibly to encrypt data in accordance with the first aspect of the present invention.

In a fourth aspect of the present invention there is provided a memory system for connection to a host processor, the system comprising: a solid state memory having non-volatile memory sectors which are individually addressable and which are arranged in erasable blocks of sectors, each said sector having a physical address defining its physical position in the memory; and a controller for writing data structures to and reading data structures from the memory, wherein the controller includes means for translating logical addresses received form the host processor to physical addresses received from the host processor to physical addresses of said memory sectors in the memory; and wherein each said memory sector is physically partitioned into a data area and a spare area and the controller is configured so as to write overhead data (OD) comprising header data and error connection code data (ECC) at a position in the sector which is offset from the start of the data area of the sector and to write user data, received from the host processor, in the space remaining in the sector, on either side of the overhead data (OD), the user data and header data being divided into portions which are encrypted in the memory sector by scrambling, the step of scrambling the user data and header data being performed by a portion address to flash portion address function.

Conveniently said overhead data (OD) is offset by an amount which is determined by at least one bit of the user data to be written to the sector.

The foregoing and other objects, features and advantages of the present invention will be apparent from the following detailed description of the preferred embodiments which make reference to several figures of the drawing.

IN THE DRAWINGS

FIG. 2 shows a schematic representation of typical prior art flash memory partitioning;

FIG. 3 shows a schematic representation of the top level memory structure of a prior art system;

DETAILED DESCRIPTION OF THE PREFERRED EMBODIMENTS

Figure 1:
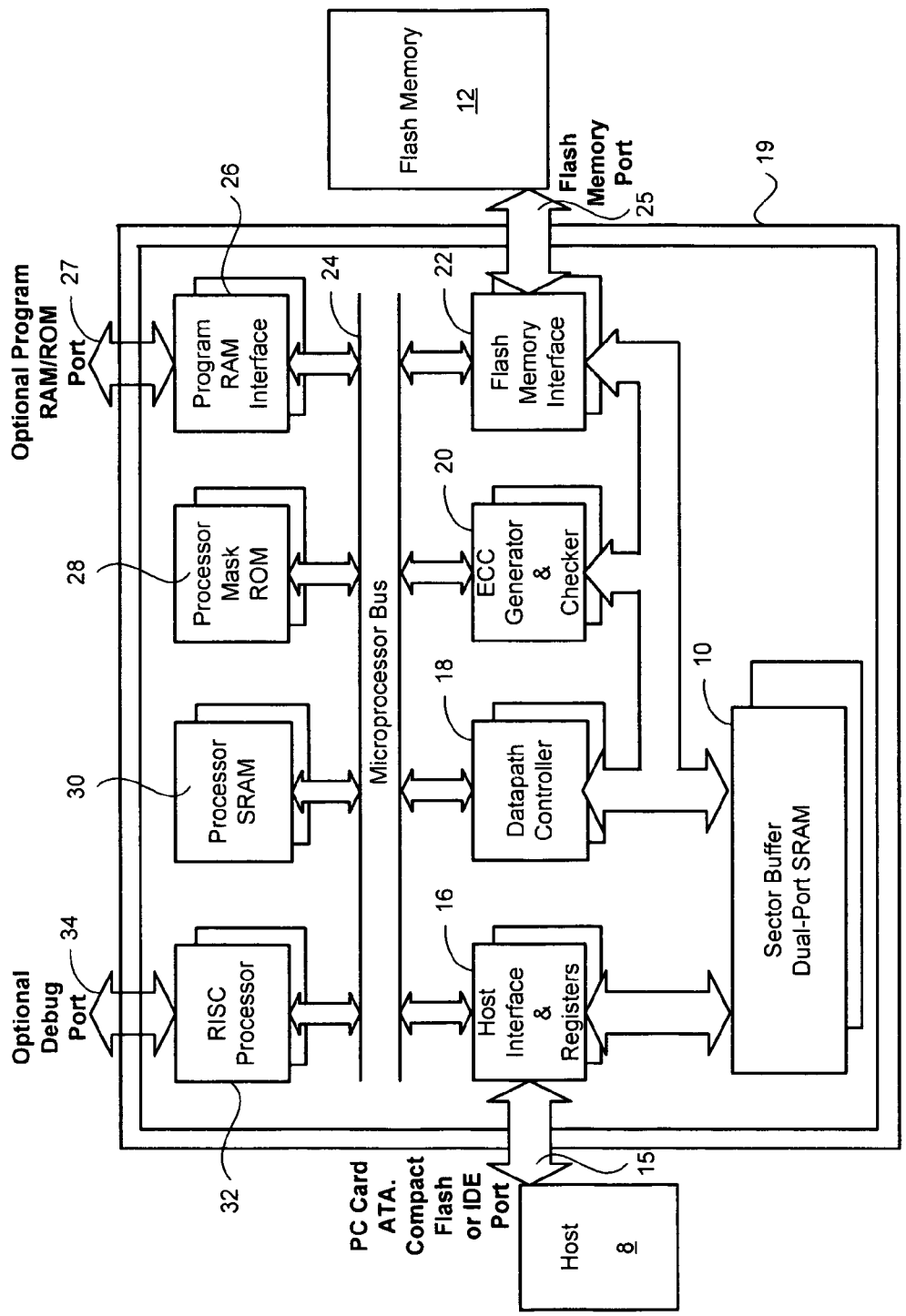
FIG. 1 shows a schematic prior art memory system.
Figure 4:
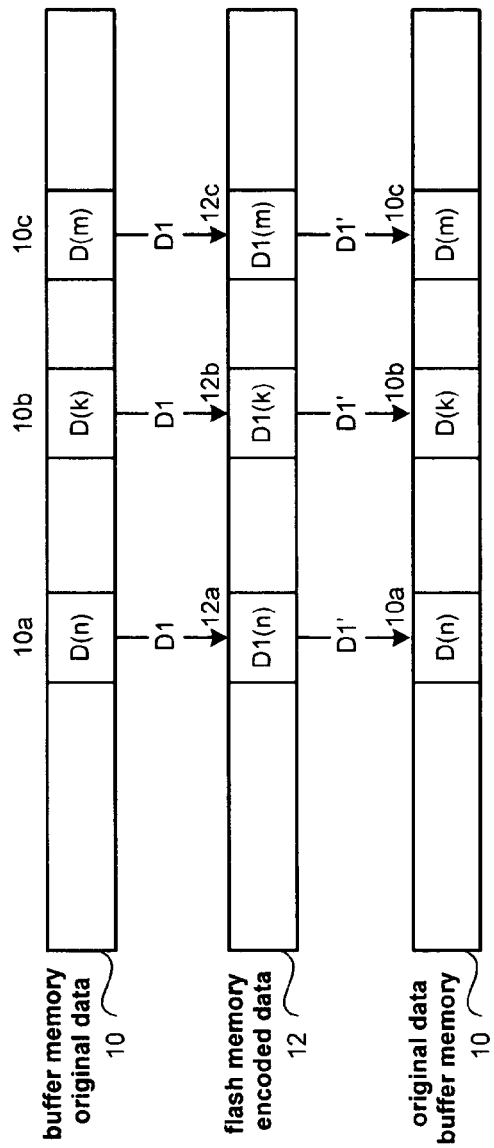
FIG. 4 shows a schematic representation of an encryption and corresponding decrypting method according to a first embodiment of the present invention.

With reference to FIG. 4, there is shown a schematic representation of a first embodiment of a method of encrypting data (and corresponding method of decrypting data) before it is written to flash memory 12 (FIG. 1). 512 bytes of user data and 4 bytes of header data, split into data portions which comprise a plurality of bits, in this case 4 bits, are represented within buffer memory 10, by $d(n)$, $d(k)$, $d(m)$ . . . etc. An encoding function D1, which is a mathematical function such as an exclusive OR function (XOR function) performed with a parameter, such as the addresses of the data portions, is applied to each byte portion, e.g. $D(k)$ which acts on the byte portion to generate an encoded byte portion $D1(k)$ which is written to flash memory 12 as encoded data. The D1 encoding function can be considered a data to flash data function. The encoded byte portion $D1(k)$ is of the same size as the original byte portion $D(k)$ and is written to the flash memory data portion address 12b which corresponds to the buffer memory data portion address 10b from which is was read. In order to decode the encoded information stored in the flash memory 12, a decoding function D1', which is, as before, an XOR transformation with a parameter such as the addresses of the data portions and which is, due to its symmetric nature, the reverse of encoding function D1, is applied to the encoded data $D1(k)$ stored in flash memory 12 when the data is read therefrom. The function D1' decodes the data $D1(k)$ returning it to the original user data and header data format $D(k)$ writing it to buffer memory 10 at buffer memory data portion address 10b from which it was initially read. The D1' function can be considered a flash data to data function.

Figure 5A:
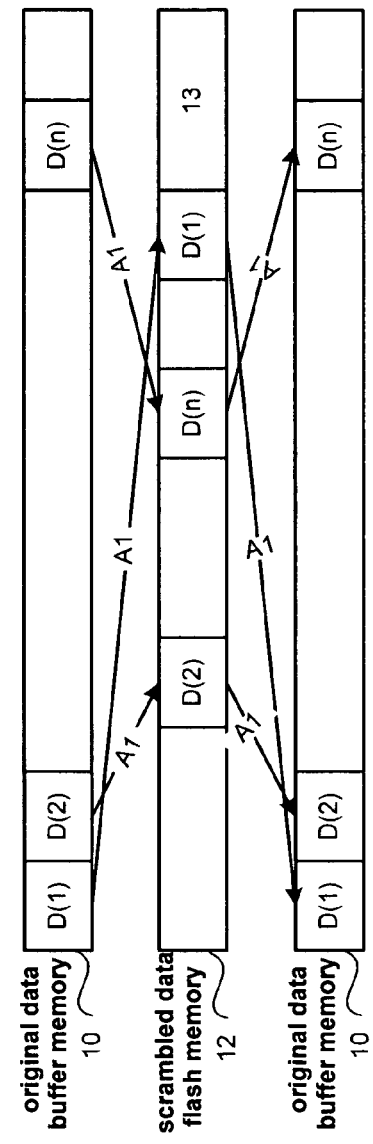
FIG. 5A shows a schematic representation of an encryption and corresponding decryption method according to a second embodiment of the present invention.

With reference to FIG. 5A there is shown a schematic representation of a second embodiment of a method of encrypting data and corresponding method of decrypting data. In this arrangement the original data is split into byte portions which are represented within the buffer memory 10 by $D(1)$, $D(2)$ . . . $D(n)$. A scrambling function A1 such as an exclusive OR function is applied to the data portions which are stored in the buffer memory 10. The scrambling function A1 modifies the address of each of the data portions thus mixing the data portions D(1) to D(n) within the data block array area 13 of flash memory 12 so that any data portion, e.g. D(1) is located at an address within the flash memory array 13 which is different from the original address of the data portion D(1) within the buffer memory 10. The A1 function can be considered an address to flash address function.

By applying A1', which is the same byte-wise XOR function as A1, to the scrambled data, the original unscrambled user data and header data is retrieved. This means that in order to return the scrambled data to its original format all of the scrambled data portions must be accessed.

The A1' function, being an XOR function, unscrambles the scrambled data because the XOR function is a symmetrical reversible function and therefore acts as the reverse of the scrambling function A1 and returns the data to its original array address within the buffer memory. The A1' function can be considered a flash address to address function.

Figure 5B:
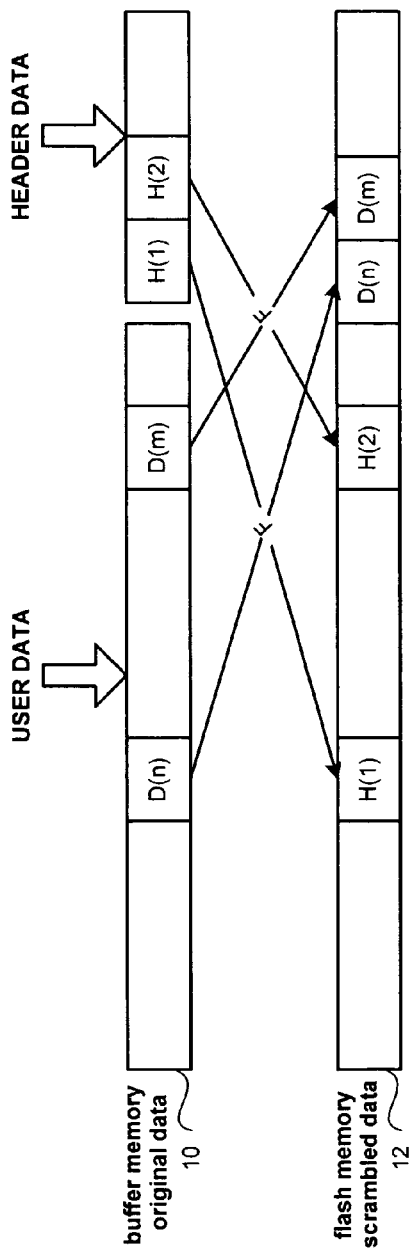
FIG. 5B shows a schematic representation of a scrambling function of the encryption process of FIG. 5A.

An example of he scrambling function operating on user and header data portions is shown in FIG. 5B. Two data portions of the 512 bytes of user data in buffer memory 10 are represented by D(n) and D(m) where $0 \leq n, m \leq 512$ and two data portions of the 4 bytes of header data are represented by H(1), H(2).

The scrambling function A1 is such that header data portion H(1) is positionally interchanged with user data portion D(n), the header data portion H(2) is positionally interchanged with user data portion D(m) in the flash memory 12. The addresses n and m etc. are a function F of parameters P1, P2 etc:

$$n = F(1, P1, P2, \ldots) \text{ and}$$

$$m = F(2, P1, P2, \ldots).$$

The parameters P1, P2 etc. may be determined by, for example, the physical location or by the data itself. For example, if the function F is parameterized by both the user data and the header data parameter P1 is:

$$P1 = D(1) \oplus D(2) \oplus \ldots \oplus D(512) \oplus H(1) \oplus \ldots \oplus H(4)$$

where $\oplus$ is a byte-wise exclusive OR function.

The encryption methods of the first and second embodiments provide read-protection for data stored in non-volatile memory and are simple to implement within a variety of memory systems. The two embodiments of encryption methods can also be combined easily to provide more complex encryption functions. As the encryption function can be parameterized by the memory sector address, or by the memory sector data itself, the final location of any data portion within the data block is not predefined.

Figure 6:
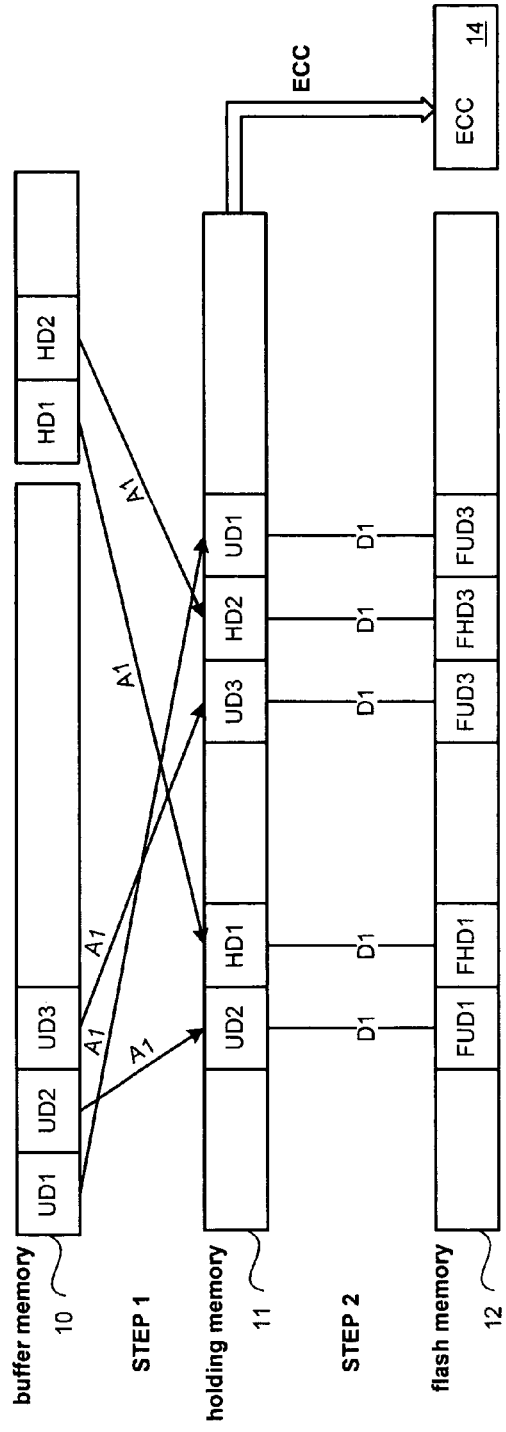
FIG. 6 shows a schematic representation of an encryption method according to a third embodiment of the present invention.

In FIG. 6 is shown a third embodiment of an encryption method wherein the encryption method is a combination of the encryption by encoding method of FIG. 4 and the encryption by scrambling method of FIGS. 5A or 5B.

With reference to FIG. 6, the user data UD and header data HD in buffer memory 10 are divided into data portions of a determined byte size (e.g. 4 bytes) and shown individually as UD1, UD2, etc. for user data, and HD1, HD2, etc. for header data. The positions of these data portions are scrambled by an address to flash address function A1 as they are transferred between buffer memory 10 and flash memory 12. This function modifies the addresses which are supplied to buffer memory 10 such that the sequence in which data portions are read from buffer memory 10 corresponds to the positional order in which they are required to be located in a memory sector in flash memory 12. The sequence of reading from buffer memory 10 corresponds to the positional order in the memory sector because the data portions are transferred serially to flash memory 12. In FIG. 6, the data portions in the sequence in which they are read from buffer memory 10 are represented as data portions held in a virtual holding memory 11. The A1 function is parameterized by the memory sector address the logical sector data are going to be written to and, in this case, is a simple modification (which is carried out on the hardware) of the byte address on the buffer address bus. The scrambled data in virtual memory 11 are used to generate an error correction code (ECC) field 14. In step 2 every portion of the scrambled data in virtual memory 11 is read and encoded using a data to flash data function D1 and thereafter stored in flash memory 12. The D1 function is parameterized by the memory sector address thus providing different ways of encoding data allocated in different memory sectors. It may also be parameterized by the data portion address within the memory sector, thus providing different ways of encoding different data portions belonging to the same logical sector and allocated in the same memory sector.

The encrypted data in the flash memory 12 can be read by carrying out the reverse operation. Thus, the flash memory sector data are decoded by flash data to data function D1'. The ECC is checked using the original ECC and the decoded data. The decoded data is then unscrambled by flash address to address function A1'.

Figure 7:
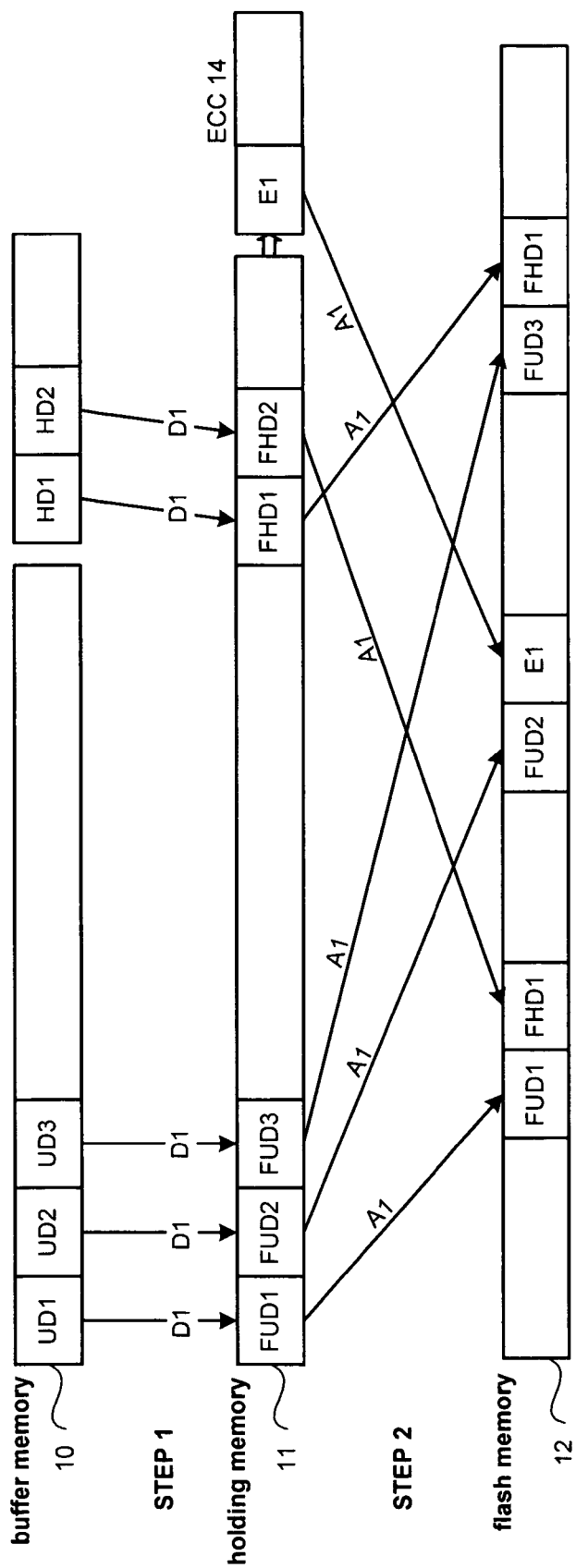
FIG. 7 shows a schematic representation of an encryption method according to a fourth embodiment of the present invention.

As is shown in FIG. 7, the order in which the scrambling and encoding functions are applied can be interchanged. In this case, a two stage process is used to achieve encoding of the data portions by function D1 with generation of an ECC field, followed by scrambling by function A1. In the first stage, data portions are read from buffer memory 10 in sequential order with each being encoded inturn by function D1, and ECC field 14 is generated and stored in ECC block 20. The encoded data portions are not physically stored but the process of encoding them is represented in FIG. 7 by the creation of virtual holding memory 11. The second stage is equivalent to scrambling the data portions and ECC portions in virtual holding memory 11 by function A1 and writing them to flash memory 12. This is achieved by implementing the scrambling and encoding process described with reference to FIG. 6 with the additional step of executing scrambling function A1 on the stored ECC portions and transferring them to flash memory 12 together with the scrambled data portions. This order of encryption followed by scrambling provides the additional advantage of scrambling the ECC field 14 as well as the user data UD and header data HD. As before, the reading of the encrypted data is achieved by carrying out the reverse process with the ECC being checked as before.

The processing of the data, in order to encrypt or decrypt the data respectively, can be implemented in a 'security block' within either processor firmware of a memory system or within hardware of the memory device.

Figure 8:
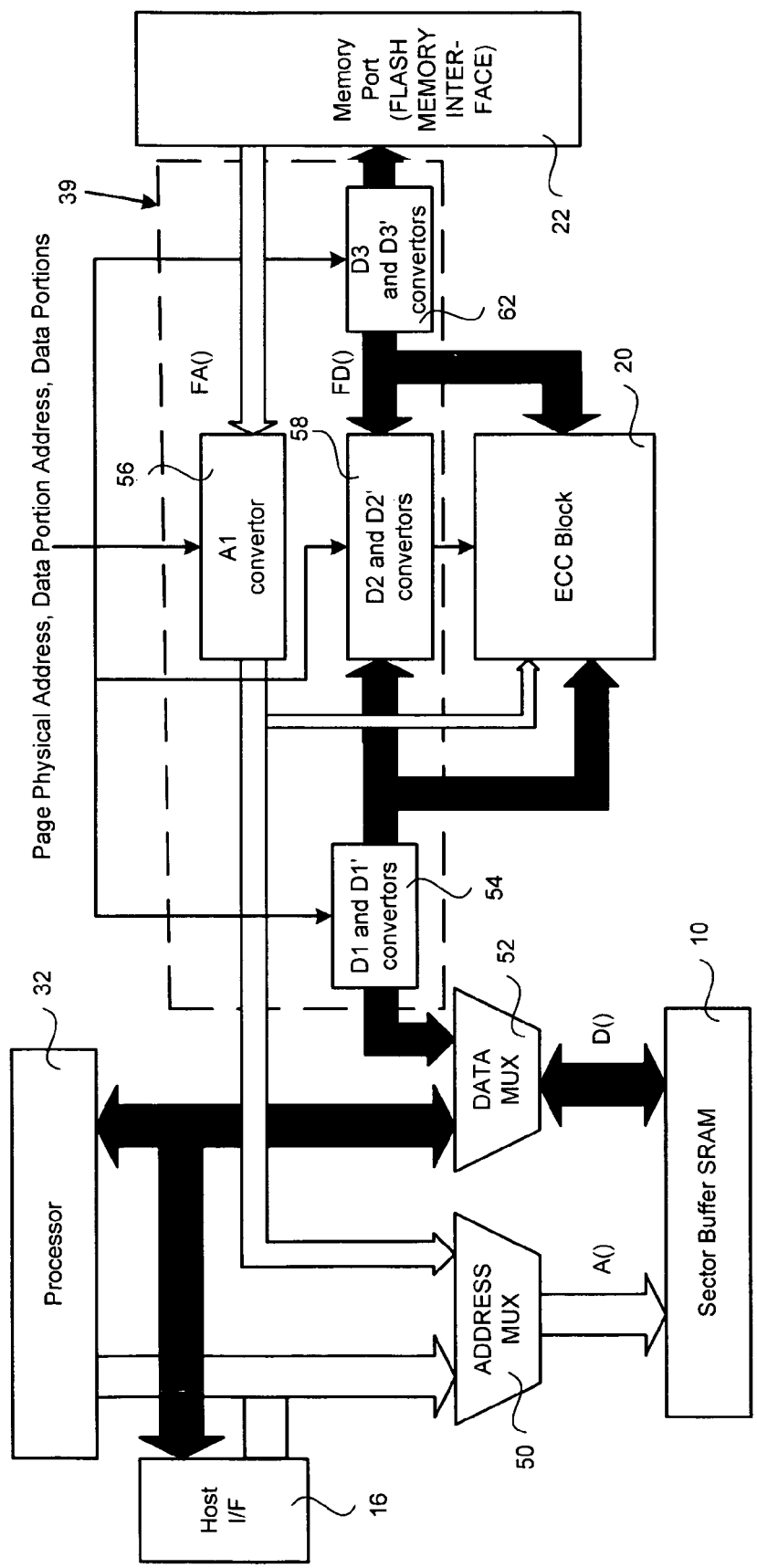
FIG. 8 shows a schematic representation of a hardware arrangement in which the encryption process of the present invention may be implemented.
Figure 9:
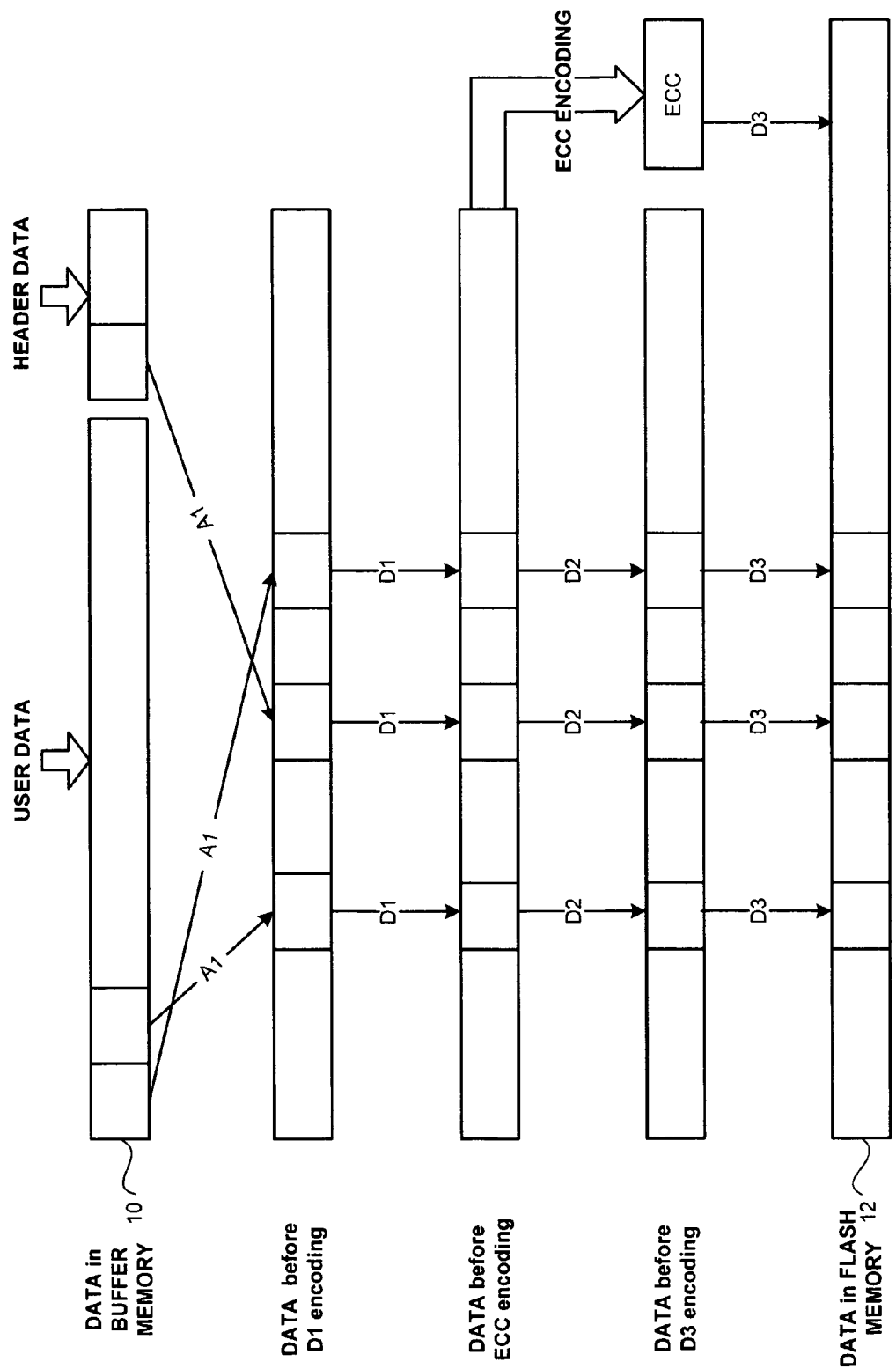
FIG. 9 shows a schematic representation of the encryption process implemented by the arrangement shown in FIG. 8.

In FIG. 8 there is shown a hardware implementation of a security block 39 within which the encryption and decryption process detailed in FIG. 9, including that detailed in the embodiment of FIG. 6, is carried out. The hardware in which the security block 39 is located comprises processor 32, host interface 16, sector buffer SRAM 10, memory port 22 (i.e. flash memory interface) and ECC generator 20, together with an address multiplexer 50, security block 39 being formed by a D1/D1' converter 54, a D2/D2' converter 58, a D3/D3' converter 62, and an A1/A1' converter 56.

The block of data (comprising 512 bytes of user data) is generated by the host, via the host interface 16 and is located in buffer memory 10 prior to any modification, having an appropriate header of 4 bytes added to the end. The block of data is represented by a plurality of contiguously addressed data portions represented as before as UD1, UD2 . . . , and H1, H2, . . . The A1 converter 56 scrambles and data block by modifying the data portion address issued by the memory port module 22 for any of the data portions being input by the host and the overhead data generated by the controller. This is in contrast to the typical memory port function of just counting the data portions to be written to the memory (not shown). In this case the A1 converter 56 is an address mixer which perform, for example an XOR function on each portion address. This means that the user data, supplied by the host, is mixed with the header data located in the sector buffer SRAM 10. In the simplest case only the 4 byte sector header data is pre-written to the sector buffer SRAM 10. The scrambled data is then sent to converter 54 which performs encoding function D1, which is an XOR function with a parameter, upon each of the scrambled and D1 encoded data portions. At the same time as this, the ECC block generator 20 generates the ECC using the scrambled and D1 encoded data. The ECC data, and scrambled and D2 encoded data are both then written to converter 62 which performs encoding function D3, which is, for example an XOR function with a parameter, on all the data being written to the memory including the ECC block. The encrypted data is then written to the memory via memory port 22. It can be seen from FIG. 8 that the ECC block 20 is arranged so that it always receives data which has already been scrambled and/or encoded.

In FIG. 9 is shown a schematic representation of the data modifications of an example encryption process which is implemented tin the hardware of FIG. 8. The user data is located in buffer memory 10 with the appropriate header data added at the end. The A1 function, step 1, which in this case is a simple modification of the byte address of each data portion of the buffer address bus, scrambles together the user data and header data. The scrambling function is provided 'on the fly' by the A1 converter 56, i.e. part of the hardware. The A1 function is parameterized by the address of the memory sector thus providing an extra level of security by blurring out data patterns. The user data supplied by the host may also be used as a parameter. Every portion of the scrambled data is then encoded using encoding function D1 which is as before an XOR with a parameter. As before the XOR function D1 is parameterized by the memory sector address and the data portion address within the memory sector. The scrambled and D1 encoded data is used to generate the ECC field in ECC block generator 20. The scrambled and D1 encoded data is also sent to converter 58 where it is further encoded by XOR encoding function D2, which is parameterized in the same manner as function D1. The scrambled and D1/D2 encoded data is then sent, along with the ECC, to converter 62 which performs the XOR encoding function D3 on each portion of data thus providing encrypted data which is sent to the flash memory via memory port 22. When data is being read from the memory, the converters 62, 58 and 54 perform the decoding functions D3', D2' and D1' respectively, each of which is an XOR function.

In the decryption process corresponding to the encryption process of FIG. 9, the memory data is read via memory port 22 and is decoded by functions D3', D2' and D1' respectively which are the same XOR functions as D3, D2 and D1 respectively. The ECC is checked using the decoded data and the original ECC and, if necessary, error correction is performed. The decoded data is then unscrambled by the A1' function of converter 56 providing the original user data and header data.

Figure 10:
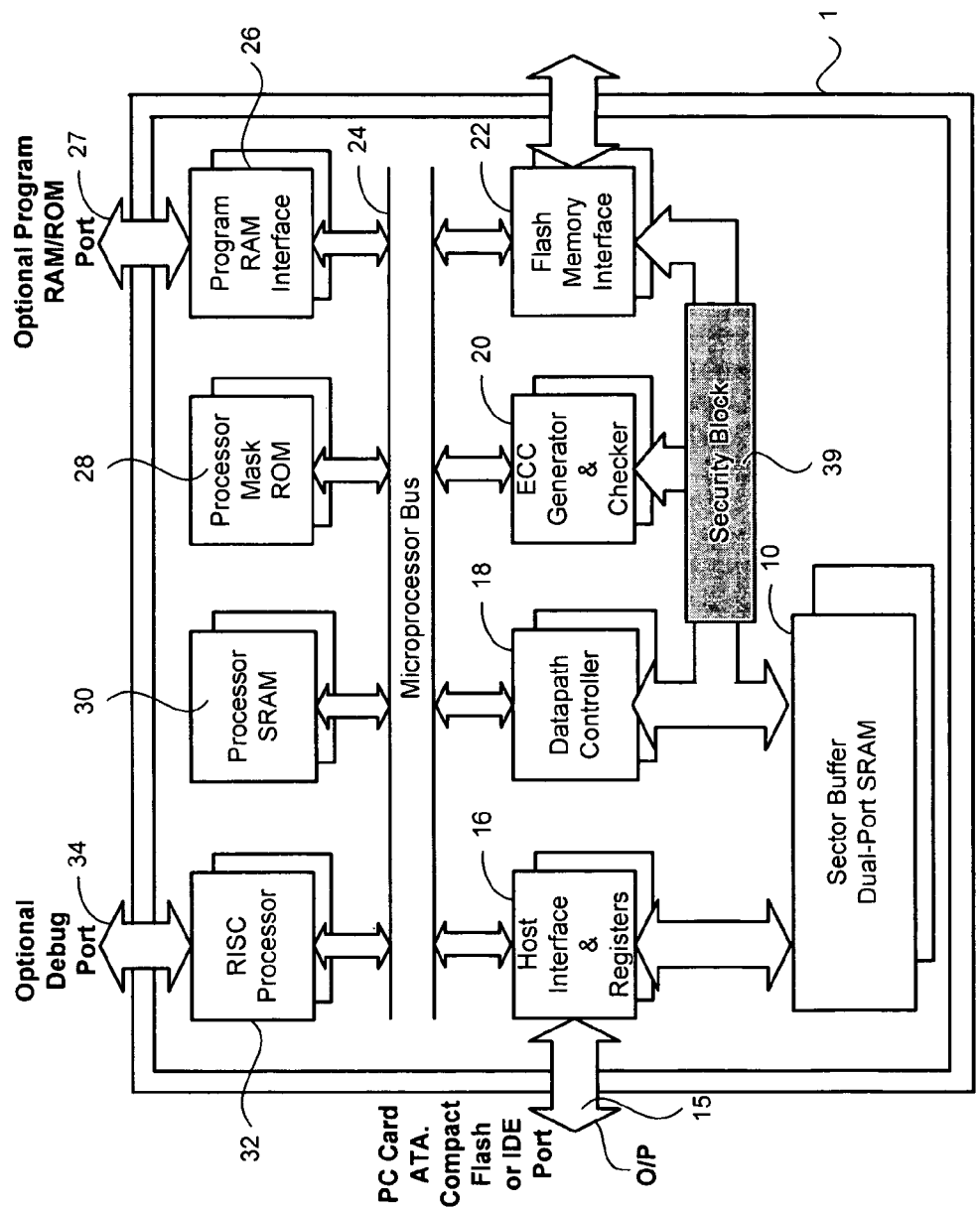
FIG. 10 shows a schematic layout of a memory system in which the encryption and decryption process of the present invention is implemented.

The security block 39, such as that of FIG. 8 in which the encryption/decryption process is implemented, can be inserted in various memory systems. A first example of such a memory system is shown in FIG. 10, which is similar to the system shown in FIG. 1, wherein security block 39 is inserted in the data bus and buffer memory address bus connecting the sector buffer memory 10 to the data path controller 18, the ECC generator and checker 20 and the flash memory interface 22. By positioning the security block 39 on the data bus it allows flexibility to encrypt the user data and header data, either before the ECC is generated (in parallel with the ECC generation) or, if desired, the user data and header data (which may already by encrypted) can be encrypted together with the generated ECC data. The positioning of the security block 39 on the buffer memory address bus allows it to modify the address generated by flash memory interface 22 in FIG. 10.

Figure 11:
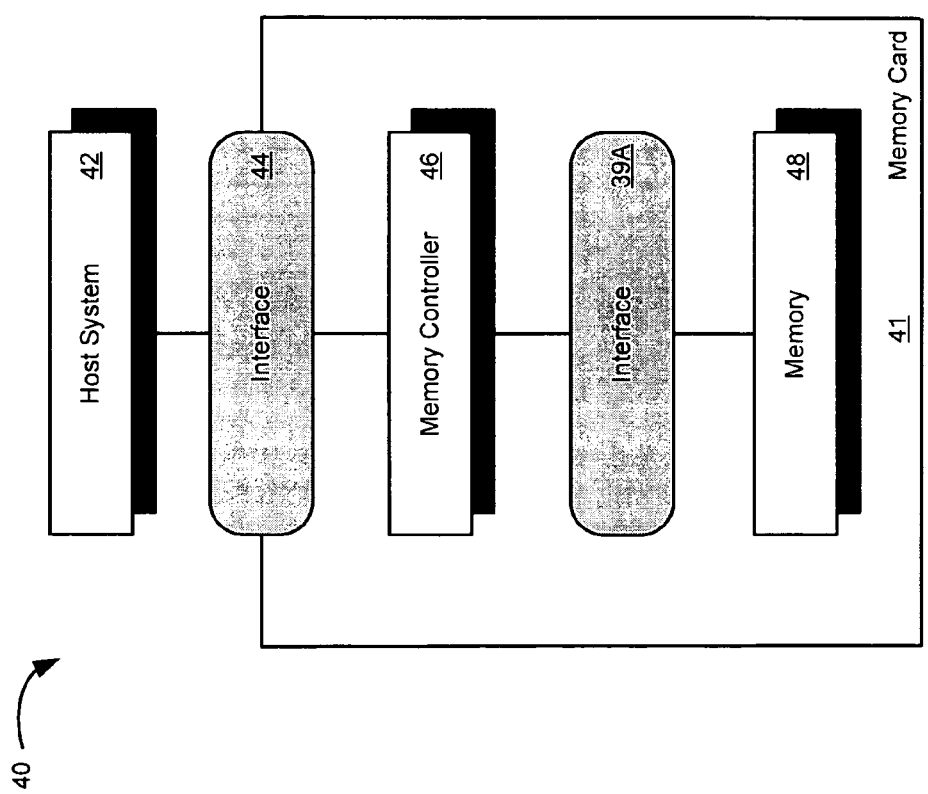
FIG. 11 shows a schematic representation of a top level memory structure in which the encryption and decryption process of the present invention is implemented.

In an alternative system, shown in FIG. 11, which is similar to that of FIG. 3, the security block is implemented as part of an interface 39A between memory controller 46 and memory 48 within the memory card 41. This provides the memory card 41 with both password protection at the secure memory card interface 44 and encryption protection at interface 39A.

Various modifications may be made to the invention as hereinabove described without departing from the scope of the invention. For example, in the examples shown the buffer memory stores data which has been written to it by the host. However, it may alternatively store data from a variety of sources such as the control processor. The memory which the encryption process protects may be any non-volatile memory such as flash memory. As described, the encoding function which is applied to each data portion is the same for each data portion. However, in order to provide a higher level of encryption the encoding function may be different for each data portion which is encoded. Furthermore, the encoding function has been described as an XOR with a parameter. However, it may alternatively be a parameterized barrel shift function, a combination of an XOR function and barrel shift function or any other similarly symmetric function. If the encoding function is non-symmetric the decoding function required will be the reverse of the encoding function first applied and not merely the same function applied again.

It should be noted that the encryption method which is detailed in the description is an example only and alternative, more complex data encryption methods, such as complex scrambling or encoding functions, may be implemented in the same manner.

It should also be noted that the encryption process may be applied to the user data only. Alternatively, it may, as described, be applied to all of the data thus additionally protecting the data structure.

In the example of encryption given in FIGS. 8 and 9, the ECC is generated in the ECC generator before being written to converter 62 where it is encoded with all the other data. However, in general, ECC is generated 'on the fly' and copied directly from the ECC generator to the flash interface. Another method which may be employed however is the pre-generation of ECC wherein it is copied to the sector buffer SRAM and from there is scrambled and/or encoded with all the other data. Also, in the shown examples, the ECC checking is carried out on data which is read from the non-volatile memory. However, the ECC checking could be carried out on data which is first transferred to the sector buffer from the non-volatile memory and then transferred from the sector buffer to the ECC block. It should also be noted that the parameters which define the encryption process may be defined by a variety of factors, such as the controller processor, or some predefined value which may be any number; for example, the serial number unique to each memory device.

Other factors which may define the parameters are, for example, the data portion address within a sector, which can be used for encoding only and acts to "blur" data having the same pattern, the memory sector address, which can be used to provide different encryption of the same data or sector written at different locations within the memory. Alternatively, using up to all of the sector data as a parameter makes the final data partitioning, as a result of data scrambling, unpredictable. Therefore, in order to work out the parameter, up to all of the sector data should be read first. Another alternative factor, which may be used to define a parameter, is a user password that can be used to protect the user data only, in which case only the user data is encrypted, or can be used to protect all of the sector data, in which case the overheads and control data structures are also encrypted. This latter case makes the card unusable by another user because, in order to decrypt the data and/or allow the memory system to find the data, the user password should be given by the host first.

It is also the case that in some embodiments the security block, in which the encryption is carried out, may be implemented as a controller processor firmware function without any need for change in the physical controller architecture providing it has access to an ECC block and a sector butter SRAM. This would mean that the processor could move data from one location in SRAM to another location, thus simulating the A1 function. IT would be capable of reading the ECC field from the ECC block and copying this to the SRAM and any data within the sector buffer SRAM could be modified within the processor, thus implementing D1, D2 and D3 function equivalents.

Another modification which may be made is that the sector buffer SRA may be either a dual port RAM or a single port RAM with shared access.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of processing sector data before being written or stored in non-volatile memory comprising:
   Receiving sector data for writing to the non-volatile memory, the sector data including user data and associate header data;
   Storing the received sector data in byte portions within a buffer memory; and
   Encrypting the sector data before the sector data is written to non-volatile memory wherein a scrambling function is performed to modify the address of the byte portions to mix the byte portions when the same is stored within the non-volatile memory so that the byte portions are each located at an address within the non-volatile memory which is different from the original address of the byte portions within the buffer memory.

2. A method of processing data, as recited in claim 1, further including retrieving the scrambled sector data to form retrieved scrambled sector data and decrypting the retrieved scrambled sector data by using a descrambling function on the byte portions of the retrieved data.

3. A method of processing data, as recited in claim 1, wherein performing the scrambling function 'on the fly'.

4. A memory system for receiving sector data from a host system and for writing thereof comprising:
   non-volatile memory arranged to present the logical characteristics of a disc storage device to a host system; and
   a controller having buffer memory and for managing sector data transfers to and from the non-volatile memory, the controller being adapted reversibly to encrypt the sector data before the sector data is written to non-volatile memory wherein a scrambling function is performed to modify the address of the byte portions to mix the byte portions when the same is stored within the non-volatile memory so that the byte portions are each located at an address within the non-volatile memory which is different from the original address of the byte portions within the buffer memory.

5. A memory system, as recited in claim 4, wherein the sector data includes user data and associate header data.

6. A memory system, as recited in claim 5, wherein the scrambling function acts to modify the byte address of each byte portion within the buffer memory.

7. A memory system, as recited in claim 6, wherein, the scrambling function scrambles together the user data and header data.

8. A memory system, as recited in claim 7, including a first converter for performing the scrambling function.

9. A memory system, as recited in claim 6, wherein the scrambling function is performed 'on the fly'.

10. A memory system, as recited in claim 6, wherein the scrambling function is parameterized by the address of the sector.

11. A memory system, as recited in claim 6, wherein the user data is used as a parameter.

12. A memory system, as recited in claim 6, further including a second converter for encoding every portion of the scrambled sector data using an encoding function D1.

13. A memory system, as recited in claim 12, further including an ECC block generator coupled between the buffer memory and the non-volatile memory for scrambling and encoding the sector data to generate an ECC field.

14. A memory system, as recited in claim 12, further including a third converter for further encoding the scrambled and encoded data using an encoding function D2.

15. A memory system, as recited in claim 14, wherein the encoding functions D1 and D2 are performed with parameters in the same manner.

16. A memory system for receiving sector data from a host system and for writing thereof comprising:
   non-volatile memory arranged to present the logical characteristics of a disc storage device to a host system: and
   a controller having buffer memory and for managing sector data transfers to and from the non-volatile memory, the controller being adapted reversibly to encrypt the sector data before the sector data is written to non-volatile memory, the sector data including user data and associate header data wherein a scrambling function is performed to modify the address of the byte portions to mix the byte portions when the same is stored within the non-volatile memory so that the byte portions are each located at an address within the non-volatile memory which is different from the original address of the byte portions within the buffer memory, wherein the scrambling function acts to modify the byte address of each byte portion within the buffer memory;

a first converter for encoding every portion of the scrambled sector data using an encoding function D1;

a third converter for further encoding the scrambled and encoded data using an encoding function D2;

a third converter for receiving the scrambled and encoded data D1 and D2 and the ECC field for performing an encoding function thereon using an encoding function D3 on each portion of the sector data thus providing encrypted data which is sent to the non-volatile memory.

wherein the encoding functions D1 and D2 are performed with parameters in the same manner.

17. A memory system, as recited in claim 16, wherein the first and second converters are used to perform decoding functions when data is being read from the non-volatile memory.

* * * * *